Figure 1:
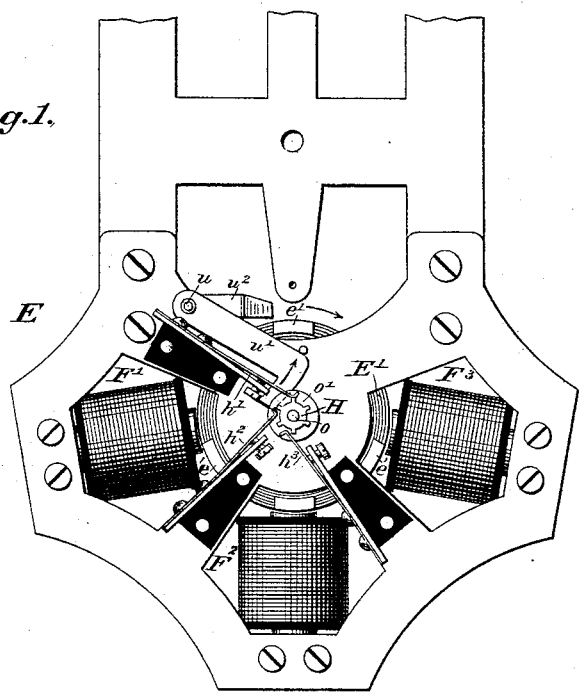

(No Model.)

F. W. BRAINERD.
ELECTRIC MOTOR FOR SELF WINDING CLOCKS.

No. 388,622. Patented Aug. 28, 1888.

Witnesses,
Geo. W. Breck
Carrie E. Ashley,

Inventor,
F. W. Brainerd,
By his Attorneys
Pope, Edgcomb & Terry.

UNITED STATES PATENT OFFICE.

FRANK W. BRAINERD, OF CHICAGO, ILLINOIS.

ELECTRIC MOTOR FOR SELF-WINDING CLOCKS.

SPECIFICATION forming part of Letters Patent No. 388,622, dated August 28, 1888.

Application filed May 25, 1888. Serial No. 275,042. (No model.)

*To all whom it may concern:*

Be it known that I, FRANK W. BRAINERD, a citizen of the United States, residing in Chicago, in the county of Cook and State of Illinois, have invented certain new and useful Improvements in Motors for Self-Winding Electric Clocks, of which the following is a specification.

The invention relates to the general organization of rotating electric motors, and more especially to their application to self-winding clocks; and it relates particularly to the class of self-winding clocks described in a patent issued to Chester H. Pond November 25, 1884, No. 308,521. Clocks of this character are so organized that a circuit will be completed through the rotary motor at proper intervals—say, for instance, once an hour—and the revolutions of the armature will wind the clock-spring a predetermined amount and then automatically sever the circuit-connections. It is evident that when the circuit through the motor is interrupted the tendency of the main-spring is always to turn the motor-armature backward until the spring is unwound. To avoid this, it has been customary to apply to some part of the clock-movement a dog or locking-pawl, which shall prevent the spring from unwinding when the current through the electro-magnet has ceased. Such pawl or dog will arrest the armature in any position which it may chance to occupy, and unless the motor is so carefully built and adjusted that it has no dead-points it is liable to stop sometimes in such a position that upon the next closing of the circuit it will be unable to start, and in consequence the clock will presently cease to move. This result has heretofore been avoided by constructing the motors with great precision and by careful adjustment and testing of the motors after they are put together. This entails considerable additional expense.

My invention consists in dispensing with the usual dog or locking-pawl applied to the clock-movement and applying to the motor itself a device which arrests the armature-drum in any of one or more predetermined positions when its current has ceased. There are many different ways whereby this may be accomplished, but one which has been found to work very successfully in practice will be described. This consists of a lever or detent which may be thrown into the path of the armature when the latter commences to revolve backward. This detent is so located with reference to the electro-magnets of the motor that when arrested the armature-drum shall stand in such a position that a forward movement will be insured upon the next completion of the circuit.

The invention consists, therefore, not in removing dead or neutral points from the motor, but in causing the armature-drum to stop, after performing its work, in a definite predetermined position, where there is no neutral or dead point to interfere with its starting when the current is applied. It is well known that an electric motor having dead-points may do as effective work as one without them, provided the armature-drum is once started. Therefore, provision being made for stopping it at a point other than a neutral or dead point, it cannot fail to start. It is not always necessary to employ three electro-magnets in the motor, and its general construction may be variously modified.

Figure 2:
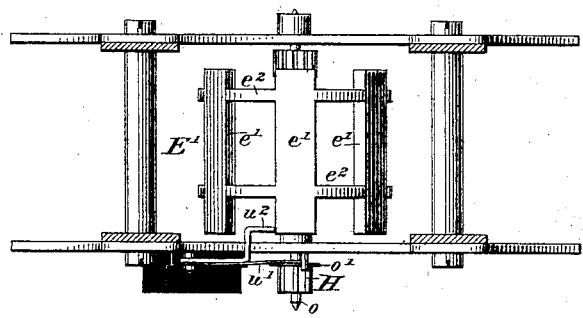
Figure 3:
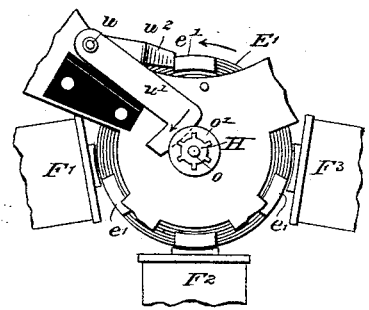

In the accompanying drawings, Figure 1 is a front elevation of a motor equipped with a device of the character mentioned. Fig. 2 is a plan of the same, and Fig. 3 shows the position of the parts when the motor is at rest.

Referring to the figures, E represents the electric motor, having an armature, E'. This consists of the central post, $o$, carrying a series of bar-armatures, $e'$ $e'$, supported upon end plates or heads, $e^2$ $e^2$. There are shown here three magnets, F' F² F³, through which circuit-connections are completed in succession by means of commutator-springs $h'$ $h^2$ $h^3$ and a suitable commutator, H. When the circuit is closed through these magnets, the armature tends to revolve in the direction indicated by the arrow in Fig. 1. Upon the pinion or shaft $o$ there is carried a flange, $o'$, against the inner surface of which there presses an arm or detent, $u'$, which is pivoted at $u$. This arm and flange may serve to better conduct the current from the frame of the clock to the commutator of the motor. There is also carried by or attached to the arm $u'$ an arresting-arm, $u^2$, which is designed to be thrown into the path of the armature-bars. As the armature is revolved in the direction indicated by the arrow, Fig. 1, this arm is thrown upward out of the path of the armature-bars by reason of the friction between the arm $u'$ and the flange $o'$. When, however, the motor has ceased to operate and the spring of the clock-work tends to turn the armature in the direction indicated by the arrow, Fig. 3, the friction between the flange and the arm $u'$ throws the arm $u^2$ into the path of the armature-bars, as shown in Fig. 3. When, therefore, the armature has turned back to a predetermined position, as shown in Fig. 3, it will be arrested. This position is such that the armature-drum will start when the circuit is again closed through the motor, as at this point there is no "dead-point" to interfere, inasmuch as armature $e'$ is in a position to be attracted by magnet $F'$ when the circuit is again completed, magnets $F^2$ and $F^3$ being cut out of circuit while the armature-drum is in this position.

Other forms and arrangements of arresting devices than that shown may be devised and employed without departing from the spirit of the invention; but it will be understood that the fundamental feature of the invention is the arresting of the armature-drum in such a position with reference to the magnetic field of the magnet which is next to act upon again closing the circuit that it shall not be at a dead-point.

I claim as my invention—

1. The combination, with a clock mechanism and an electric-motor armature for winding the same, of a detent for arresting the armature in a predetermined position with reference to the magnetic field of the motor upon its retrograde movement and a connection between the armature and the arresting-detent, substantially as described.

2. The combination, with a clock mechanism and an electric-motor armature for winding the same, of a detent for arresting the armature in a predetermined position with reference to the magnetic field of the motor upon its retrograde movement.

3. In a self-winding clock having an electric motor with a rotating armature, the combination, with the armature-drum, of a pivoted arresting-detent intercepting the path of the armature-drum upon the backward movement of the same and a frictional connection between the armature-shaft and said detent for throwing the same out of the path of the armature-drum during the forward movement of the latter, substantially as set forth.

4. In a self-winding clock, the combination, with a rotary electric motor for winding the clock mechanism having the armature-bars $e'$ $e'$, of the arresting detent $u^2$ for intercepting the paths of the same, the frictional lever $u'$, moving with the arresting-detent, and the flange or disk upon the armature-shaft engaging the end of the frictional lever, substantially as described.

5. In a self-winding clock having a rotating electric motor, the combination, with the motor, of an arresting device for the armature of the same stopping the armature in a predetermined position other than a dead or neutral point upon the cessation of the winding.

6. In a self-winding clock mechanism having a rotating electric motor for winding the same, the combination, with the driving-spring of the clock tending to normally reverse the direction of rotation of the motor upon the cessation of winding, of an arresting device acting in conjunction with said spring to arrest the armature of the motor in a predetermined position other than a dead-point of the motor at the cessation of the winding, substantially as described.

7. In a clock mechanism having a winding electric motor with a rotating armature, the combination, with the armature-drum, of a pivoted arresting detent intercepting the path of the armature-drum upon the backward movement of the same, and a frictional connection between the armature-shaft and said detent for throwing the same into the path of the armature-drum during the retrograde movement of the latter, substantially as described.

In testimony whereof I have hereunto subscribed my name this 15th day of May, A. D. 1888.

FRANK W. BRAINERD.

Witnesses:
CHESTER H. POND,
W. E. WITHERBEE.